United States Patent [19]

Margetts

[11] Patent Number: 4,923,036
[45] Date of Patent: May 8, 1990

[54] DISC BRAKES

[75] Inventor: Hugh G. Margetts, Ross-on-Wye, England

[73] Assignee: Lucas Industries public limited company, Birmingham, United Kingdom

[21] Appl. No.: 342,622

[22] Filed: Apr. 24, 1989

Related U.S. Application Data

[63] Continuation of Ser. No. 105,732, Oct. 7, 1987, abandoned.

[30] Foreign Application Priority Data

Oct. 16, 1986 [GB] United Kingdom ................ 8624800

[51] Int. Cl.5 .............................................. F16D 55/26
[52] U.S. Cl. .................................. 188/72.6; 188/71.9; 188/72.9; 188/153 D; 192/70.24
[58] Field of Search .................... 188/72.6, 72.9, 72.7, 188/71.9, 370, 153 D; 192/70.23, 70.24

[56] References Cited

U.S. PATENT DOCUMENTS

| | | | |
|---|---|---|---|
| 2,319,231 | 5/1943 | Hawley | 188/72.6 |
| 3,435,691 | 4/1969 | Cock et al. | 188/72.7 X |
| 3,690,417 | 9/1972 | Airheart | 188/72.6 X |
| 3,830,343 | 8/1974 | Gardner | 188/72.7 X |
| 4,207,970 | 6/1980 | Shimizu | 188/71.9 |
| 4,460,069 | 7/1984 | Boyles | 188/72.7 |
| 4,522,286 | 6/1985 | Villata et al. | 188/72.7 |
| 4,637,498 | 1/1987 | Thompson et al. | 188/72.6 X |
| 4,681,194 | 7/1987 | Tsuruta | 188/726 X |

FOREIGN PATENT DOCUMENTS

| | | | |
|---|---|---|---|
| 1217223 | 5/1966 | Fed. Rep. of Germany | 188/72.6 |
| 3213355 | 11/1982 | Fed. Rep. of Germany | 188/72.9 |
| 1453106 | 8/1966 | France | 188/153 D |

Primary Examiner—George E. A. Halvosa
Attorney, Agent, or Firm—Scrivener and Clarke

[57] ABSTRACT

The present specification discloses a disc brake for use on a commercial vehicle. The disc brake has a brake actuation mechanism which is movable axially by brake operator mounted in a part of the disc brake. The brake operator has an axis of actuation which extends in the same general direction as the axis along which the brake actuator moves to apply the brake. This construction leads to a compact overall design wherein the brake operator is part of the brake itself.

8 Claims, 3 Drawing Sheets

DISC BRAKES

This application is a continuation of application Ser. No. 07/105,732, filed Oct. 7, 1987, now abandoned.

The present invention relates to a disc brake for use on a vehicle.

In particular the present invention relates to a disc brake for use on commercial vehicles in the light and medium weight range, i.e. in the 3½ to 11 tonne range. Traditionally drum brakes have been used on the light to medium weight range of commercial vehicles. However, in recent years there has been a trend to adopt hydraulically actuated disc brakes, as disc brakes can be serviced, i.e. pads replaced, quicker than drum brakes, and also disc brakes tend to be more stable and less sensitive to fade than drum brakes.

One disadvantage of conventional hydraulically actuated disc brakes lies in their unsuitability for the provision of a parking/emergency brake which in the case of the heavy weight range of commercial vehicles tends to be mechanically/pneumatically applied. However, known heavy weight range disc brakes of the required type are bulky items, especially with respect to the design and construction of the mechanical/pneumatic actuators, and whilst such bulky items can be relatively easily installed on large commercial vehicles, they are not readily applicable to the smaller commercial vehicles in the light and medium weight range. To explain, one form of mechanical actuator used on the large heavy weight commercial vehicle range comprises a helical ball and ramp arrangement with an associated operating lever which is pivotable about the axis of the actuator. In this case, the brake applying means has to be either attached to the vehicle axle and connected to the said lever by a mechanical linkage, or mounted on large flanges attached to the brake.

Another form of mechanical actuator used on the large heavy weight commercial vehicle range comprises a wedge and roller device arranged to move in a plane inclined to the axis of the brake actuator. In this latter case the brake applying means, e.g. a pneumatically controlled device, is located on the end of the angled wedge and roller device. Clearly, both of the above constructions are bulky and expensive and not readily applicable to the smaller, light and medium weight vehicle range. This is especially the case as smaller diameter, low profile tyres become more acceptable to commercial vehicle manufacturers.

The aim of the present invention is to provide a disc brake which is readily applicable to the small and medium weight range of vehicles.

According to the present invention there is provided a disc brake comprising a brake actuation mechanism which is axially movable by brake applying means mounted on a part of the disc brake, the brake applying means having an axis of actuation which extends in the same general direction as the axis along which the brake actuator mechanism moves to apply the brake.

In a preferred embodiment of the present invention the brake applying means comprises a hollow casing defining a chamber which is divided by a flexible diaphragm. The diaphragm is connected to a piston, and together with a piston rod forms an assembly. The piston and piston rod are axially movable in a direction parallel to the said axis of said actuator mechanism, against a spring, by the introduction of air pressure into the chamber on the side of the flexible diaphragm remote from the piston. Alternatively, hydraulic or mechanical pressure may be applied to the diaphragm and piston. The said assembly is connected to the brake actuation mechanism by a lever mechanism which incorporates a lever which is pivotable about an axis lying transverse to the said axis of said actuation mechanism; the lever extending through the wall of the casing of the brake applying means, and engaging around the piston rod immediately behind said piston.

With the above described preferred embodiment, the brake is compact in comparison with prior art mechanical/pneumatic arrangements by virtue of the fact that the brake applying means are mounted directly on the disc brake and are offset from the brake actuation mechanism, the brake applying means and the brake actuating means being operable in axially parallel directions. Thus the brake is more readily applicable to the light and medium weight commercial vehicle range than prior art mechanical/pneumatic arrangements. The construction described hereabove is also advantageous in the fact that it provides a degree of rationalisation and standardisation of components e.g. when used in combination with mechanical/pneumatic actuated drum brakes, or if used on all wheels of a vehicle in contrast to known vehicle constructions where combinations of hydraulic and mechanical/pneumatic brakes were used on the front and rear of the vehicle. Also, even if hydraulic pressure is used in the brake applying means described hereabove, there are no problems with fluid seal contamination as in conventional hydraulically operable disc brakes. Further, it is easier to provide for a parking/emergency brake in the brake of the present invention, and also the brake of the present invention is suitable for use on the front axles of a vehicle as due to its compactness it avoids steering and suspension linkages etc.

Whilst any desired brake actuation mechanism may be used in the present invention, the brake actuation mechanism preferably includes a load insensitive brake adjuster. One preferred form of adjuster includes an axial clearance so that there is no adjustment during the application and release of the brake when pad wear is within the clearance limit of movement. However, should pad wear be sufficient to result in excessive axial movement of the actuation mechanism to apply the brake, the adjuster is designed such that on releasing the brake, component parts of the adjuster take up the clearance and then move axially relative to each other under the action of a spring to adjust the operational length of the actuator mechanism to take account of pad wear.

The present invention will now be further described, by way of example, with reference to the accompanying drawings, in which.

Figure 1:
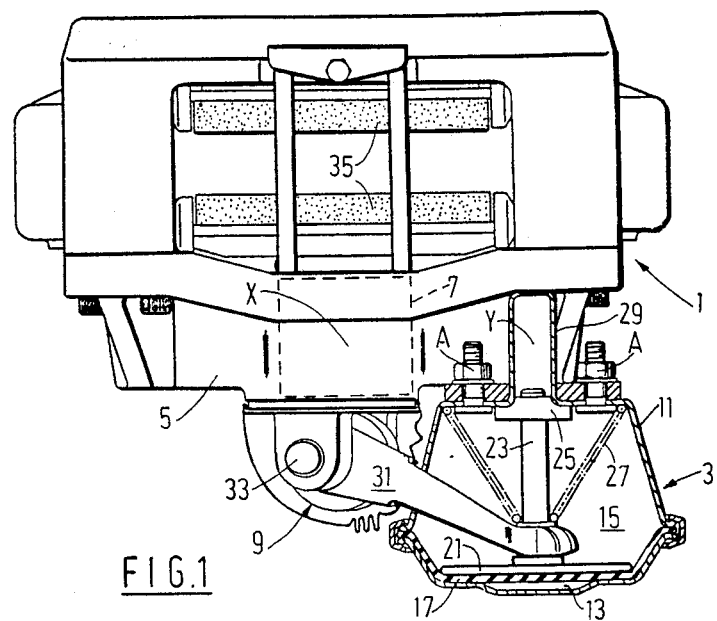
FIG. 1 is a partially cutaway plan view of a preferred embodiment of the present invention.
Figure 2:
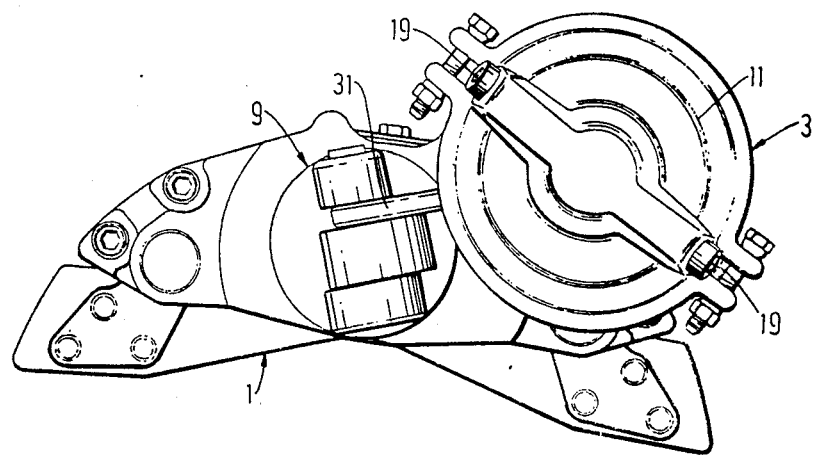
FIG. 2 is a front view of the embodiment of FIG. 1.
Figure 3:
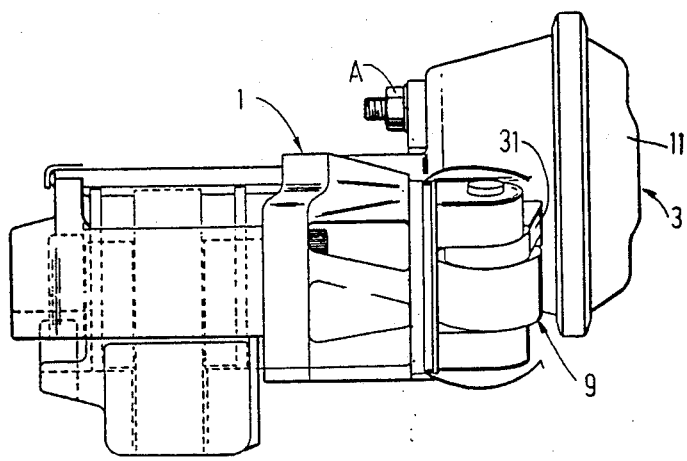
FIG. 3 is a side view of the embodiment of FIGS. 1 and 2.

The preferred embodiment of the present invention illustrated in FIGS. 1 to 4 of the accompanying drawings, is a pin sliding disc brake generally indicated at 1 to which pneumatically operable brake applying means 3 are secured. The brake 1 incorporates a housing 5 within which a brake actuation mechanism 7—see FIG. 4, —is located, the brake actuation mechanism 7 being coupled with the brake applying means 3 by a lever mechanism 9 of the form disclosed in our co-pending British Patent Application No. 86 22617.

The brake applying means 3 comprises a hollow casing 11 divided into two internal sections 13, 15 by a flexible diaphragm 17, and bolted directly to the brake 1 by bolts A. One internal section 13 of the casing 11 is, in use, connected via ports 19 to a source of pneumatic pressure whilst the other section 15 is vented to the atmosphere. Attached to the flexible diaphragm 17 in the said other internal section 15 of the casing 11, is a piston 21, a piston rod 23 connected to the piston 21 extending axially slidably through a fixed guide 25 secured in the casing and a spring 27 biasing the piston 21 and diaphragm 17 to the position illustrated in FIG. 1 with said one internal section 13 at minimum volume. By introducing pneumatic pressure into said one internal section 13 of the casing 11, the flexible diaphragm 17 and piston 21 are moved to compress the spring 27, the piston rod 23 moving through the guide 25 into an extended part 29 of the casing 11. One end region of a lever 31 of the lever mechanism 9, engages around the piston rod 23 immediately behind the piston 21 and is thus pivoted about its pivot point 33 to apply the brake pads 35 through the brake actuation mechanism 7, as the piston 21 and flexible diaphragm 17 are moved by pneumatic pressure; the direction of movement, i.e. axis Y, of the piston 21 and piston rod 23 being parallel to the direction of movement, i.e. axis X, of the brake actuation mechanism 7.

By virtue of the above described mechanical/pneumatic actuation arrangement a compact disc brake is achieved which is eminently suitable for use on the light and medium weight range of commercial vehicles. Further, as the same brake can be used on all wheels of the vehicle as opposed to a previous mix of disc and drum brakes, there is a certain rationalisation and standardisation of components which reduces manufacturing costs. Additionally there are no problems with fluid seal contamination as can happen with conventional hydraulically operable brakes. This is even the case if hydraulic pressure is substituted for pneumatic pressure in internal section 13, the flexing of the diaphragm obviating the need for fluid seals. Also, as compared to prior art brakes, usually hydraulic, for light and medium weight vehicles, it is far easier to fit a parking/emergency brake.

Figure 4:
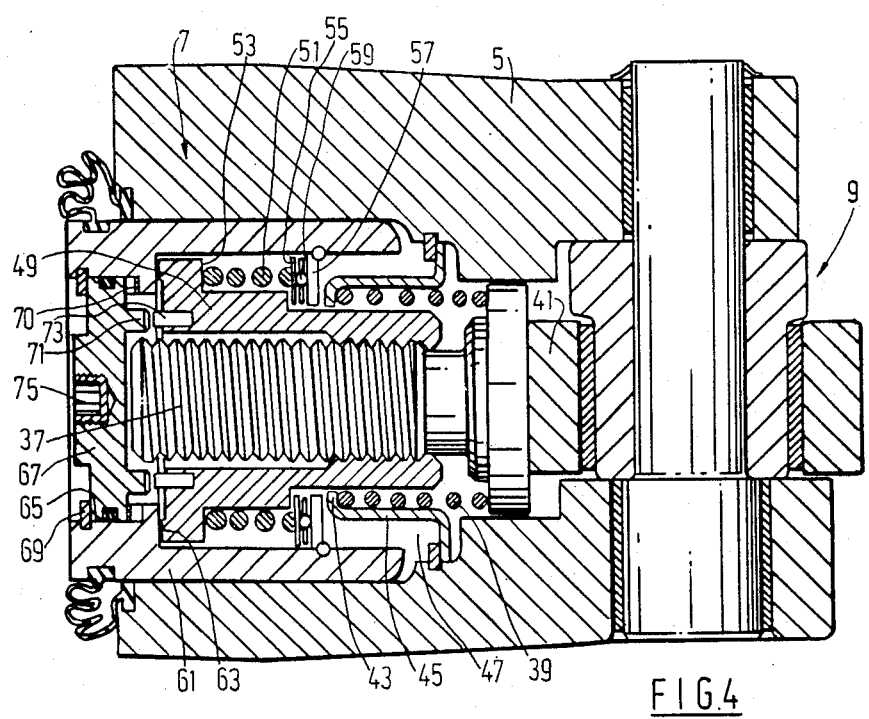
FIG. 4 is an axial cross-sectional view of the brake actuation mechanism used in the caliper of the embodiment of FIGS. 1, 2 and 3.

Referring now to the brake actuation mechanism 7-see FIG. 4, —which is operated by the lever mechanism 9 disclosed in our co-pending British Patent Application No. 86 22617, this comprises a threaded shaft 37 which is biassed by a spring 39 against a cam-like member which may be in the form of an eccentric roller 41 of the lever mechanism 9, the spring 39 engaging against an inwardly extending flange 43 of a tubular casing 45 fixed in a bore 47 in the actuator housing 5. A nut member 49 is screw-threadedly engaged on the threaded shaft 37, there being a limited amount of axial clearance between the threads so that the nut member 49 and threaded shaft 37 can move axially relative to each other to a limited extent before the meshed threads interengage. A further spring 51 is engaged between a shoulder 53 on the nut member 49 and an annular bearing plate 55 which presses against an annular support 57 via a bearing 59; said annular support 57 being fixedly secured on the inside wall of a hollow cylindrical piston 61 which engages a friction pad 35 when the brake is applied. This further spring 51 thus biasses the nut member 49 against an inwardly directed flange 63 of the hollow piston 61.

In use, when the lever mechanism 9 is operated to apply the brake, the actuating force is passed directly to the friction pad 35 via the eccentric roller 41, the threaded shaft 37, the interengaged threads between the nut member 49 and the threaded shaft 37, the nut member 49 and the piston 61. When the brake is released the threaded shaft 37 is retracted by the spring 39, and the piston 61 and pad 35 are returned by the elastic deflection of the caliper until the clamping load is removed. With limited pad wear the axial clearance between the threads on the shaft 37 and nut member 49 is merely taken up and prevents adjustment occurring. However, when the thread clearance is insufficient to cater for the pad wear the threads interengage as the brake is released and the nut member 49 is lifted off flange 63, said further spring 51 being compressed. This compression of the further spring 51 causes the nut member 49 together with the further spring 51 to rotate on the threaded shaft 37 and the annular support 57 via bearing 59, until the nut member 49 is adjusted to again engage the piston flange 63. In this adjusted position the said threads are interengaged so that application of the brake by the lever mechanism 9 is immediately effective, the thread clearance only being of consequence upon brake release.

The piston 61 has an aperture 65 at its forward end region, with reset means in the form of a rotatable disc 67 mounted so as to close off this aperture 65. The disc 67 is biassed against a circlip 69 in the wall of the aperture by a spring 70 and has a number of axially projecting tabs 71 on its surface facing the nut member 49. As and when required, e.g., when replacing the friction pads 35, the disc 67 can be moved axially against the spring 70 so that said tabs 71 engage complementary tabs 73 on the nut member 49. The nut member 49 is thus also moved axially, lifting the nut member 49 off piston flange 63 so that by the insertion of a suitable tool in recess 75 in the disc 67, the disc can be rotated, the interengaging tabs 71,73 causing the nut member 49 to thus be rotated and moved back, i.e. reset, on the threaded shaft 37.

Figure 5:
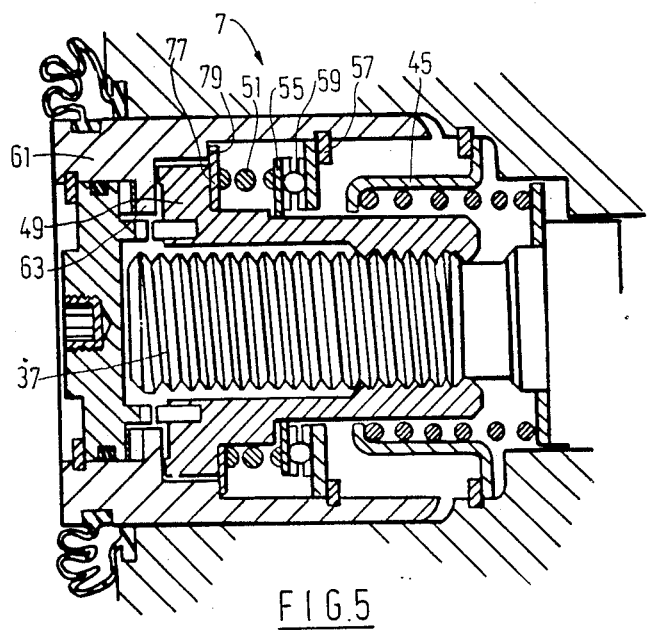
FIG. 5 is a cross-sectional view of an alternative form of brake actuation mechanism for use in the present invention.

An alternative form of adjuster suitable for use in the present invention is illustrated in FIG. 5 of the accompanying drawings, and the same reference numerals as used in FIG. 4 will be used to identify like components. The main difference between the adjusters of FIGS. 4 and 5 lies in the fact that there is no clearance between the interengaged threads on the nut member 49 and shaft 37. The axial clearance to allow for normal brake operation without adjustment is provided between the nut member 49 and both the piston 61 and an annular washer 77. In this embodiment, one end of the further spring 51 engages the annular washer 77 which, with normal brake operation, engages a shoulder 79 on the inner wall of the hollow piston 61; the other end of said further spring 51 pressing against the annular support 57 via annular washer 55 and bearing 59.

When the brake is applied braking force is transferred to a friction pad via the shaft 37, nut member 49 and piston 61, and when the brake is released the shaft 37 draws the nut member 49 back off the piston flange 63. However, when the pad wear is sufficient to require adjustment, the nut member 49 is drawn back sufficiently to engage and lift the annular washer 77 off the shoulder 79, thereby compressing the said further spring 51. The washer 55 is arranged so as to be axially slidable along the nut member 49 but keyed against relative rotation. Thus the compression of said further spring 51 causes the annular washer 55, nut member 49, and said further spring 51 to rotate on the bearing 59 about the threaded shaft 37 until the nut member 49 attains an adjusted position wherein the annular washer 77 once more engages the shoulder 79. Thus it is clear that both of the above-described adjusters are load-insensitive, adjustment only occurring on the brake releasing stroke.

The present invention thus provides a disc brake for commercial vehicles, especially light to medium weight range commercial vehicles, wherein the brake can be of compact design facilitating a rationalisation of components and the easy provision for a parking/emergency brake; adjustment preferably being by a load-sensitive adjuster mechanism operable solely during the brake release stroke.

I claim:

1. A disc brake comprising a housing, a brake actuator which is axially movable within said housing, and brake applying means mounted on a part of said housing, said brake applying means having an axis of actuation laterally spaced from the axis of actuation of said brake actuator, said brake applying means and said actuator being constructed and arranged to move in the same general direction to apply the brake, said brake applying means comprising a casing separate from said housing, means mounting said casing on said housing, said casing including a wall defining a hollow chamber which is divided by a flexible diaphragm, a piston in said chamber having inner and outer sides, said diaphragm being arranged to transmit force to the outer side of said piston, a piston rod extending on the inner side of said piston and being axially movable with said piston against a spring by the introduction of pressure fluid into the chamber on the side of the flexible diaphragm remote from the piston, and a lever having inner and outer ends, said outer end of said lever extended through said wall of said casing into said hollow chamber and engaging said piston rod in said hollow chamber on the inner side of said piston, said inner end of said lever being pivotally connected to said housing outside of said casing for rotation about an axis which is fixed relative to said housing and transverse to the axis of said actuator, said lever being pivotably by axial movement of said piston; said brake actuator including a brake adjuster, and a part movable by said lever and engaging said adjuster to move the same to apply the brake in the same general direction as said piston moves when subjected to pressure fluid, neither said lever nor said part being pivotably connected to said adjuster.

2. A disc brake according to claim 1, wherein said axes are substantially parallel to each other.

3. A disc brake according to claim 1, wherein the said axes are parallel to each other.

4. A disc brake according to claim 1, wherein the adjuster includes a clearance such that no brake adjustment occurs during application and release of the brake when pad wear is within a predetermined limit corresponding to said clearance.

5. A disc brake according to claim 4, wherein the adjuster operates solely on brake release when pad wear exceeds said clearance.

6. A disc brake according to claim 4, wherein the adjuster clearance does not diminish with increased lever load.

7. A disc brake as claimed in claim 1, wherein said part movable by said lever comprises a cam-like member having abutting engagement only with said adjuster.

8. A disc brake as claimed in claim 7, wherein said cam-like member comprises an eccentric roller.

* * * * *